(12) United States Patent
Suzuki

(10) Patent No.: US 6,963,182 B2
(45) Date of Patent: Nov. 8, 2005

(54) MOTOR CONTROL DEVICE AND MOTOR CONTROL METHOD

(75) Inventor: Hiroshi Suzuki, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 20 days.

(21) Appl. No.: 10/716,458

(22) Filed: Nov. 20, 2003

(65) Prior Publication Data
US 2004/0104697 A1    Jun. 3, 2004

(30) Foreign Application Priority Data
Nov. 29, 2002    (JP) .................... 2002-348421

(51) Int. Cl.$^7$ ................................. H02P 7/00
(52) U.S. Cl. ............... 318/254; 318/138; 318/439; 318/700; 318/811; 318/812; 318/721; 318/738
(58) Field of Search .................. 318/254, 138, 318/439, 727, 700, 811, 812, 432, 721, 599, 318/604, 738

(56) References Cited

U.S. PATENT DOCUMENTS 5,298,848 A * 3/1994 Ueda et al. .................. 318/811
5,883,484 A * 3/1999 Akao ........................ 318/700
5,955,863 A    9/1999 Iwashita et al. ............ 318/811
6,121,736 A * 9/2000 Narazaki et al. ............ 318/254
6,194,865 B1   2/2001 Mitsui et al. ............... 318/812
6,639,379 B2 * 10/2003 Matsushita et al. ......... 318/727
6,768,280 B2 * 7/2004 Kitajima .................... 318/432
6,841,968 B2 * 1/2005 Sato et al. .................. 318/727

FOREIGN PATENT DOCUMENTS

JP    11-137000    5/1999
JP    2000-341991   12/2000

* cited by examiner

Primary Examiner—Rita Leykin
(74) Attorney, Agent, or Firm—Oblon, Spivak, McClelland, Maier & Neustadt, P.C.

(57) ABSTRACT

A motor control device includes an electric voltage command value calculation means for inputting an electric current command value every control cycle, calculating an electric current deviation integrated value by integrating an electric current deviation between the electric current command value and an actual electric current value at a coil of a motor, and calculating an electric voltage command value in accordance with the electric current deviation integrated value. The electric voltage command value calculation means controls the electric current deviation integrated value not to exceed a saturation electric voltage value, a value according to the maximum value of the electric voltage outputted from the inverter circuit to the motor.

9 Claims, 9 Drawing Sheets

MOTOR CONTROL DEVICE AND MOTOR CONTROL METHOD

INCORPORATION BY REFERENCE

This application is based on and claims priority under 35 U.S.C. § 119 with respect to Japanese Patent Application No. 2002-348421 filed on Nov. 29, 2002, the entire contents of which are incorporated herein by reference.

FIELD OF THE INVENTION

The present invention relates to a motor control device and a method for motor control. The present invention pertains to a motor control device and a motor control method for controlling a motor by calculating an electric voltage command value based on an electric current deviation integrated value.

BACKGROUND OF THE INVENTION

With a known motor control device for controlling a motor such as a motor for an induction motor, a DC brush motor, and a brushless motor, an electric current command value is inputted from a superior controller every control cycle of a predetermined interval (e.g., 1 ms), an electric voltage command value is calculated based on the electric current command value, and a driving electric voltage according to the electric voltage command value is generated to be supplied to a coil of the motor. With the foregoing known motor control device, an actual electric current at the coil of the motor is detected by an electric current sensor, an electric current deviation between the actual electric current and the electric current command value is obtained, and a predetermined calculation transaction is applied to an integrated value of the electric current deviation (i.e., electric current deviation integrated value) to obtain the electric voltage command value. The electric voltage command value is sent to a PWM (Pulse Width Modulation) control portion. The PWM control portion generates a PWM pulse by switching a direct current voltage supplied from a direct current power source by a switching element of an inverter circuit to output the PWM pulse to the motor.

In order to simplify the control, generally, the electric current command applied with 3-to-2 phase conversion is inputted in the motor control device and the reverse conversion is applied (2-to-3 phase conversion) when determining the PWM pattern with a three-phase DC motor.

With the known motor control device, the electric current deviation between the actual electric current and the electric current command value is integrated every control cycle to obtain the electric voltage command value based on the integrated value (electric current deviation integrated value). Notwithstanding, the construction of the inverter circuit limits the electric voltage supplied to the motor in accordance with PWM pulse with the known motor control device.

In other words, the electric voltage supplied from the inverter circuit to the motor coil is either an electric voltage (i.e., ON) supplied from the direct current power source or 0V (i.e., OFF) momentarily. Accordingly, with the know motor control device, an objective output electric voltage is obtained as a whole by adjusting an ON time and an OFF time in one control cycle by switching the switching element. In case approximately sine wave formed electric current is supplied to the motor coil, the output electric voltage needs to be adjusted depending on the phase of the motor electric current.

On the other hand, the electric current deviation integrated value may increase irrelevant to the electric voltage (i.e., the average electric voltage of the PWM pulse) supplied to the motor depending on the operational conditions and the load at the motor. This raised a drawback at the control when the motor is suddenly stopped and the rotational direction of the motor rotating with high load is suddenly reversed. For example, in case the operation of the mechanical brake at an emergency stop and the sudden stop of the motor by the contact between the obstacle and a driven member of the motor, the back electromotive force generated by the motor rotation is suddenly vanished. Thus, the overvoltage may be applied by the excessive electric current deviation integrated value to generate the abnormal overcurrent. In case the rotational direction of the motor rotating with high load is suddenly reversed and the rotation of the motor is suddenly decreased, the control is likely to work to rotate the motor at the direction to reduce the electric current deviation integrated value (i.e., the same direction with the previous rotational direction) until the electric current deviation integrated value returns to the normal value, which may generate the delay of the response.

A need thus exists for a motor control device which has a less response delay without generating the abnormality at the sudden motor stop and at the reverse of the motor rotation.

SUMMARY OF THE INVENTION

In light of the foregoing, the present invention provides a motor control device, which includes an electric voltage command value calculation means for inputting an electric current command value every control cycle, calculating an electric current deviation integrated value by integrating an electric current deviation between the electric current command value and an actual electric current value at a coil of a motor, and calculating an electric voltage command value in accordance with the electric current deviation integrated value. The motor control device further includes a direct current power source portion for outputting a power source electric voltage of a direct current, an inverter circuit for outputting a pulse electric voltage generated by switching the power source electric voltage by a switching element to the motor, a control means for controlling a switching timing of the switching element based on the electric voltage command value, and the electric voltage command value calculation means controls the electric current deviation integrated value not to exceed a saturation electric voltage value, a value according to the maximum value of the electric voltage outputted from the inverter circuit to the motor.

According to another aspect of the present invention, a motor control method includes a process of inputting an electric current command value every control cycle, calculating an electric current deviation integrated value by integrating an electric current deviation between the electric current command value and an actual electric current value at a coil of a motor, calculating an electric voltage command value in accordance with the electric current deviation integrated value, outputting a pulse electric voltage generated by switching a power electric voltage of a direct current by a switching element of an inverter circuit based on the electric voltage command value to the motor, and controlling the electric current deviation integrated value not exceeding a saturation electric voltage value, a value in accordance with the maximum value of the electric voltage outputted from the inverter circuit to the motor.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
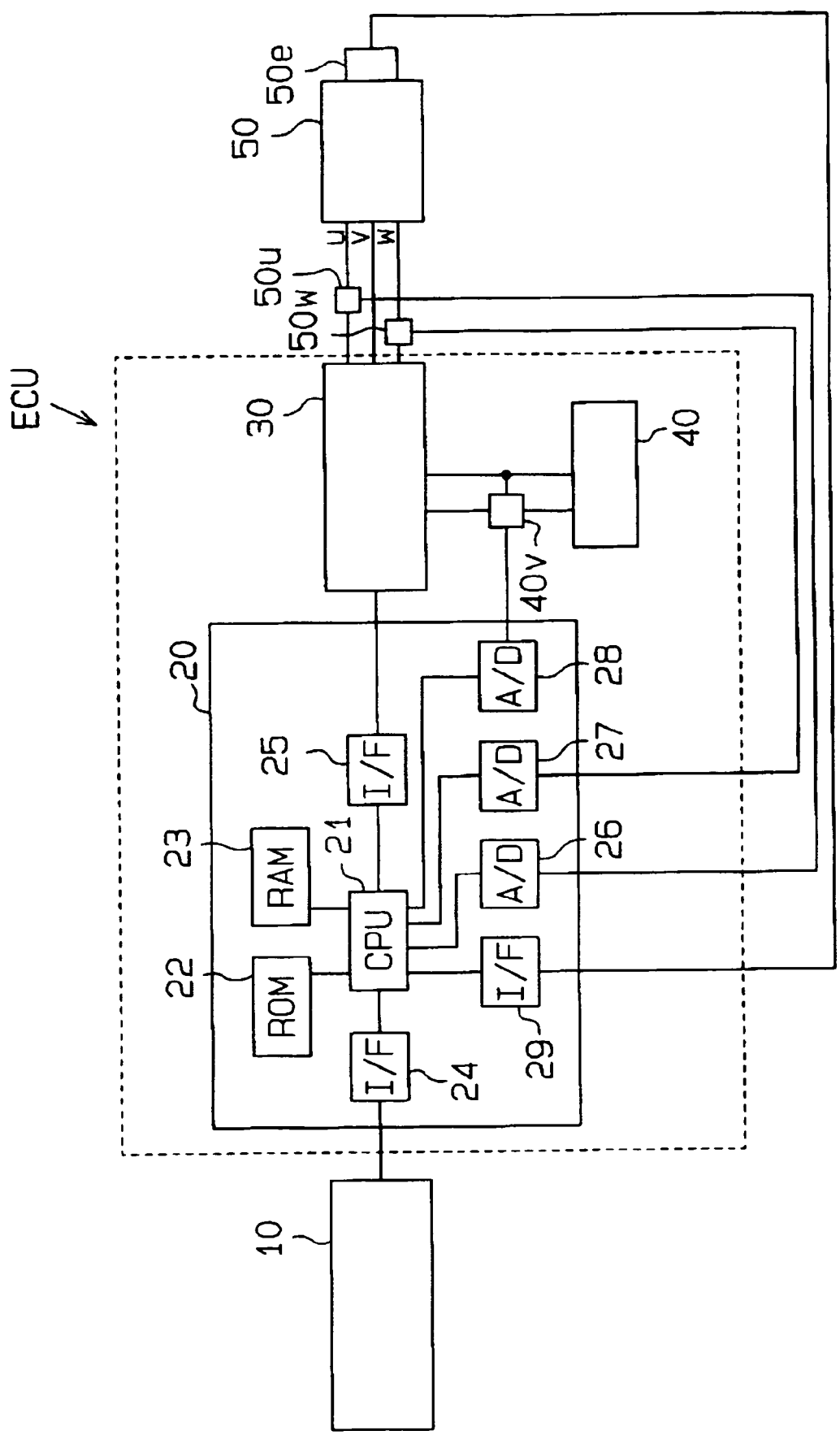
FIG. 1 is a view showing a motor control system according to a first embodiment of the present invention.

Embodiments of a motor control device and a motor control method of the present invention will be explained referring to the drawing figures as follows. A first embodiment applying the present invention to a control device for a blushless three-phase DC motor will be explained as follows. An electric control unit (ECU) serves as the motor control device in the embodiments.

A superior controller 10 shown in FIG. 1 outputs an electric current command value to be supplied to a motor 50 corresponding to the blushless three phase DC motor as an electric current command to a control portion 20 serving as a control means of a controller ECU. The control portion 20 calculates an electric voltage command value based on the input electric current command and determines a PWM output pattern of a U phase, a V phase, and a W phase by the PWM control. The PWM output pattern is sent to an inverter circuit 30. A power source electric voltage Vb of a direct current is supplied from a direct current power source portion 40 to the inverter circuit 30. The power source electric voltage Vb is detectable by an electric voltage sensor 40v serving as power source electric voltage detection means. The inverter circuit 30 generates the PWM pulse by switching the power source electric voltage Vb based on the PWM output pattern to supply the PWM pulse to the motor 50. A U phase actual electric current Iu and a W phase actual electric current Iw are detected as analogue signals by an electric current sensor 50u and an electric current sensor 50w such as a Hall Conn. to be fed back to the control portion 20. A V phase actual electric current Iv is obtained by the calculation at the control portion 20 based on the U phase actual electric current Iu and the W phase actual electric current Iw. The motor 50 includes an encoder 50e for detecting a rotational angle of a rotor of the motor 50 to feed back the information of the rotor rotation angle to the superior controller 10 via the control portion 20.

The control portion 20 includes a CPU (central processing unit) 21, a ROM 22 memorizing a program for carrying out at the CPU 21, a RAM 23 for memorizing the information required for carrying out the program, and a peripheral circuitry. The peripheral circuitry includes an interface circuit I/F 24 corresponding to the interface circuit with the controller 10, an interface circuit I/F 25 corresponding to the interface circuit with the inverter circuit 30, an interface circuit I/F 29 corresponding to the interface circuit with the encoder 50e, and various A/D converters. The A/D converters include A/D converters 26, 27 for A/D converting the analogue signals from the electric current sensors 50u, 50w and an A/D converter 28 for A/D converting the analogue signal from the electric voltage sensor 40v.

Figure 2:
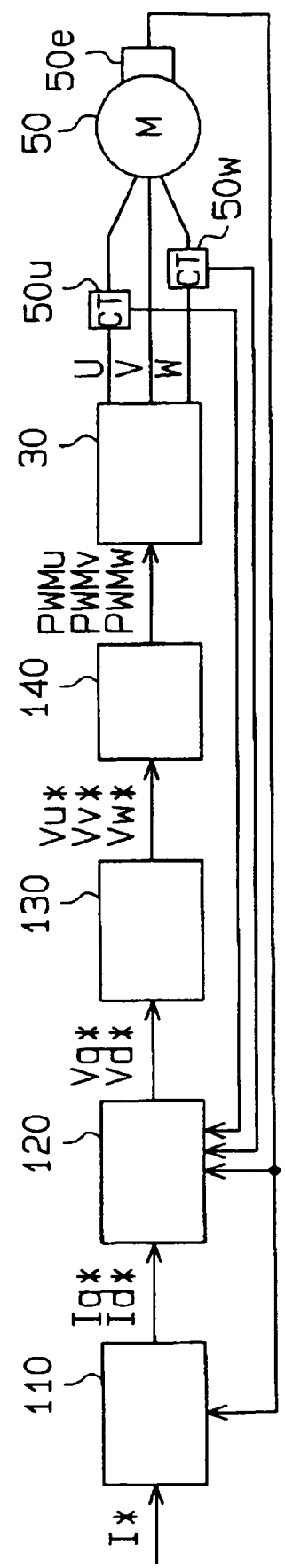
FIG. 2 is a view showing details of a function of the motor control system according to the first embodiment of the present invention.

An electric current command value calculation portion 110 shown in FIG. 2 achieves functions of the superior controller 10. The electric current command value calculation portion 110 performs 3-to-2 phase conversion based on the rotor rotation angle obtained from the encoder 50e and the electric current command value I* inputted from an external control device, or the like, to calculate the electric current command values Id*, Iq*. The electric current command values Id*, Iq* correspond to the electric current command value shown as the electric current of a d-axis element which is the same direction with the rotational magnetic flux at the rotation coordinate system synchronized with the rotational magnetic flux created by the permanent magnet on the rotor and a q-axis element arranged to be perpendicular to the d-axis. The electric current command value of the d-axis element is Id*. The electric current command value of the q-axis element is Iq*. The electric current command values Id*, Iq* are outputted to an electric voltage command value calculation portion 120 serving as an electric voltage command value calculation means.

The electric voltage command value calculation portion 120 calculates an electric voltage command value Vd* of the d-axis element and the electric voltage command value Vq* of the q-axis element based on the electric current command value Id*, Iq* and a d-axis actual electric current Id and q-axis actual electric current Iq obtained by the 3-to-2 phase conversion from the actual electric currents of the U phase, the V phase, and the W phase obtained from the electric current sensor.

The electric voltage command value Vd* and the electric voltage command value Vq* are converted into a U phase electric voltage command value Vu*, a V phase electric voltage command value Vv*, and a W phase electric voltage command value Vw* by a known calculation method at a 2-to-3 phase conversion portion 130. The electric voltage command values Vu*, Vv*, Vw* for each phase are inputted into a PWM control portion 140. The PWM control portion 140 calculates ON time/OFF time in one control cycle of the switching elements of each U, V, W phase of the inverter circuit 30 based on the electric voltage command value of each phase and generates switching control signals PWMu, PWMv, PWMw based on the calculation result to be outputted to the inverter circuit 30. The inverter circuit 30 switches the switching element following the switching control signals PWMu, PWMv, PWMw to output the generated PWM pulse to the motor 50.

The electric voltage command value calculation portion 120, the 2-to-3 phase conversion portion 130, and the PWM control portion 140 serves as a function of the control portion 20.

Figure 3:
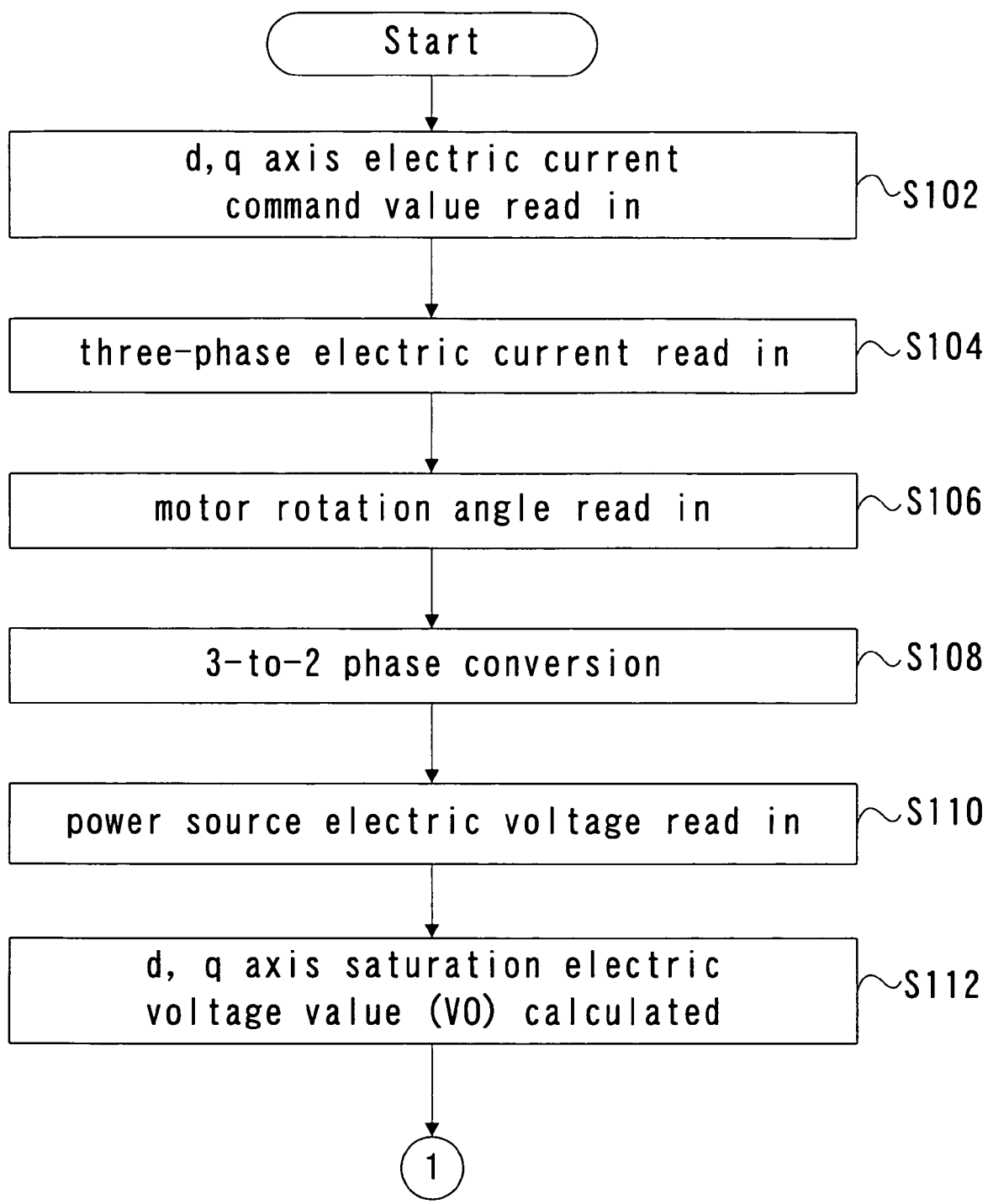
FIG. 3 is a flowchart showing a transaction at a stage before obtaining electric voltage command values Vd*, Vq* according to the first embodiment of the present invention.
Figure 4:
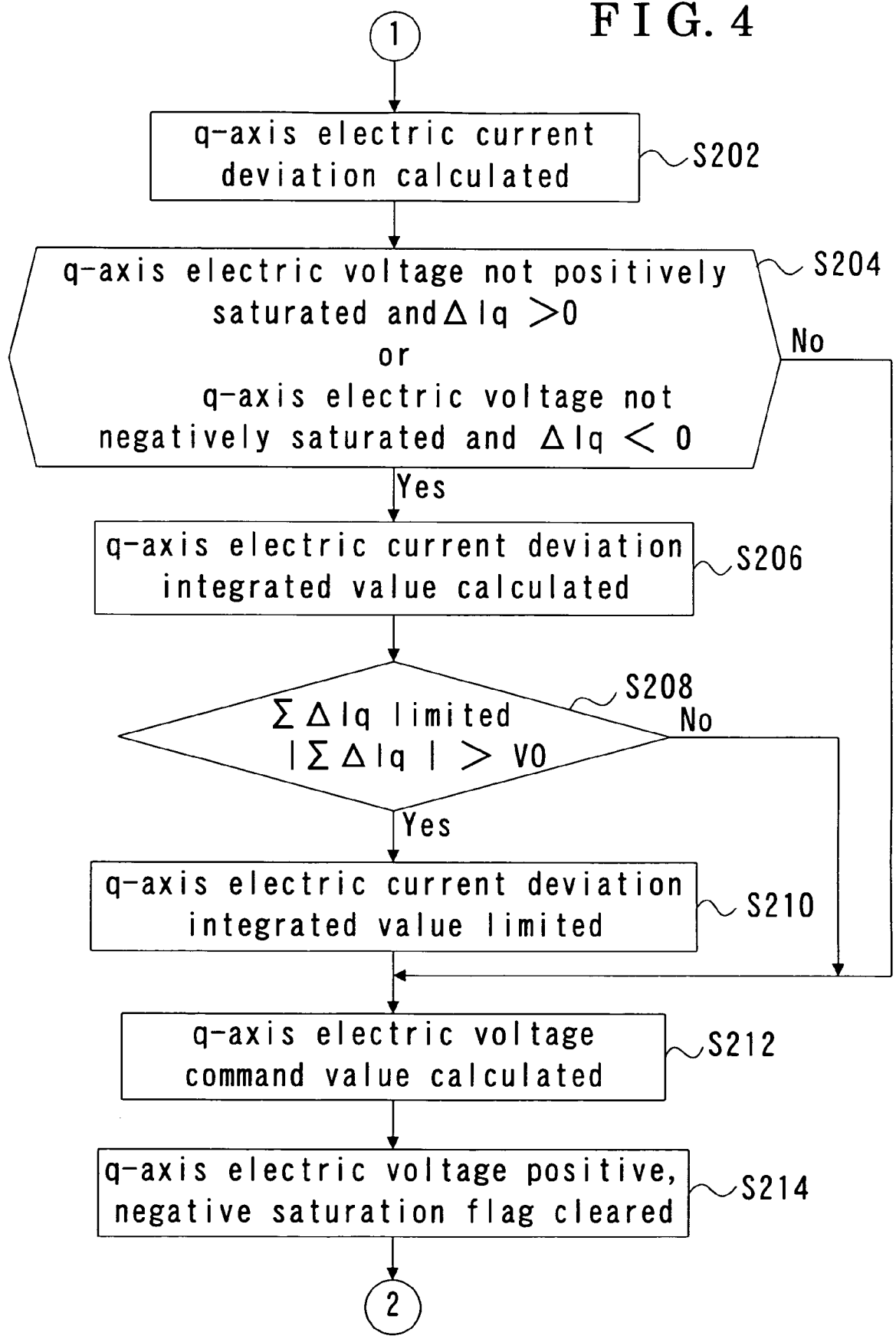
FIG. 4 is a flowchart showing a transaction for calculating the q-axis electric voltage command value Vq* according to the first embodiment of the present invention.
Figure 5:
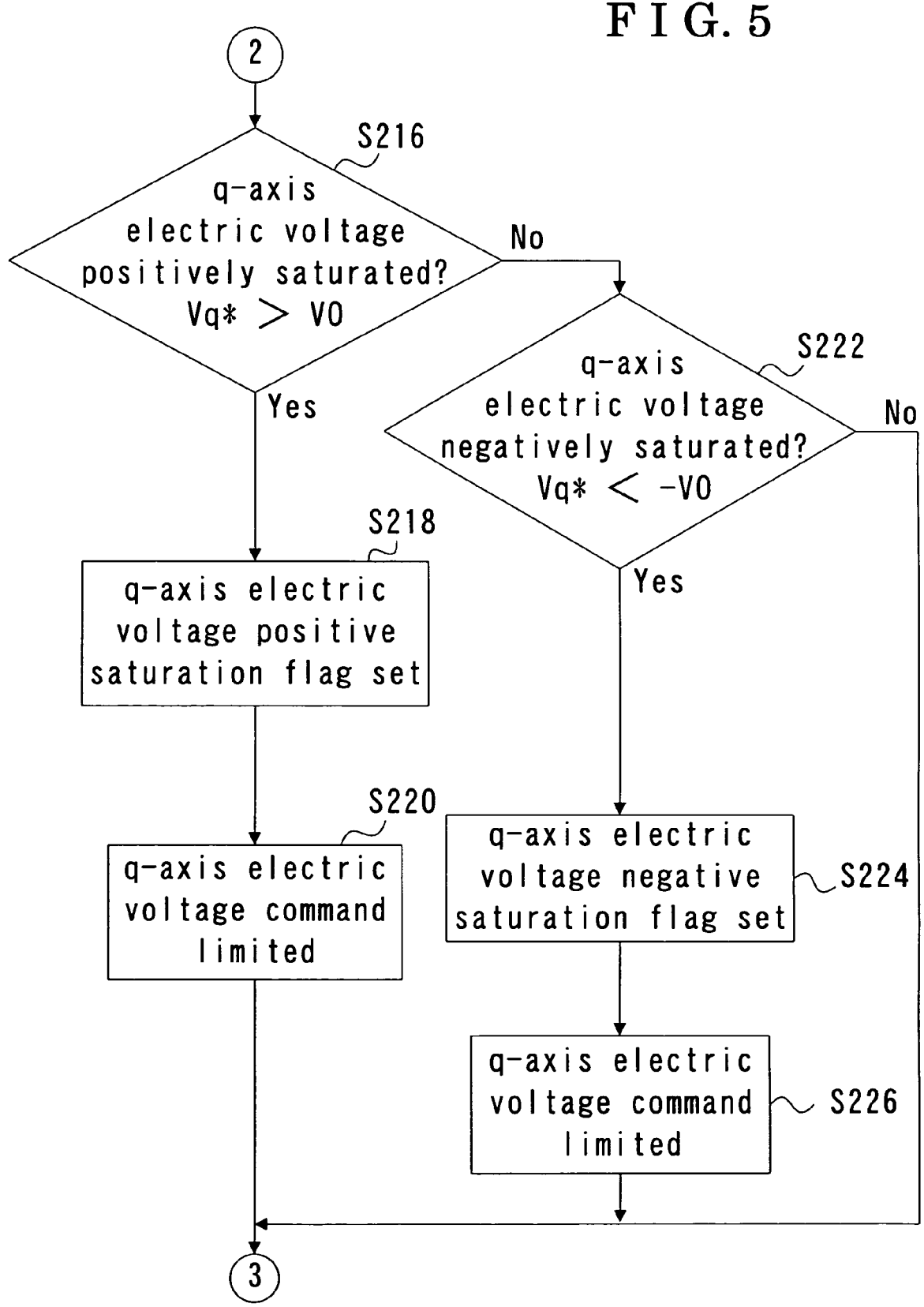
FIG. 5 is a flowchart showing the transaction for calculating the q-axis electric voltage command value Vq* continuing from FIG. 4.

Referring to FIGS. 3–5, the transaction of the electric voltage command value calculation portion 120 of the motor control system of the embodiment will be explained. The transaction at the PWM control portion 140 and the transaction at the 2-to-3 phase conversion portion 130 will be explained with reference to FIG. 8. The flow of FIGS. 3–8 will be carried out once each control cycle.

As shown in FIG. 3, at S102 the electric current command values Id*, Iq* are read in from the superior controller 10 via the interface circuit I/F 24. At S104, the U phase actual electric current Iu and the W phase actual electric current Iw are read in from the electric current sensors 50u, 50w via the A/D converters 26, 27 respectively. Also, the V phase actual electric current is calculated at S104. At S106, the rotor rotation angle is read in from the encoder 50e via the interface circuit I/F 29. At S108, the U phase actual electric current Iu, the V phase actual electric current Iv, and the W phase actual electric current Iw are performed with the 3-to-2 phase conversion based on the rotor rotation angle to obtain the d-axis actual electric current Id and the q axis actual electric current Iq. At S110, the power source electric voltage Vb is read in from the electric voltage sensor 40 via the A/D converter 28. At S112, the maximum value of the electric voltage capable of being outputted from the inverter circuit 30 in the d-axis direction and the q-axis direction of the motor (i.e., a saturation electric voltage value VO) is calculated. More particularly, the saturation electric voltage value VO is obtained by a following formula:

$$VO = Vb/2 \cdot \sqrt{(3/2)} \cdot k$$

In this case, k denotes the maximum electric voltage utilization ratio of the inverter and k serves as a constant showing the utilization ratio of the electric voltage in accordance with the limitation of the duty of the inverter.

As shown in FIG. 4, a q-axis electric current deviation ΔIq is calculated at S202. More particularly, the q-axis electric current deviation ΔIq is obtained according to the following formula:

$$\Delta Iq = Iq^* - Iq$$

The transaction at S204 judges whether the q-axis electric voltage is not positively saturated (+saturation) and the q-axis electric current deviation ΔIq is a positive value or whether the q-axis electric voltage is not negatively saturated (−saturation) and the q-axis electric current deviation ΔIq is the negative value. When an outcome of the judgment at S204 is YES, the transactions of S206–S210 are performed. When the outcome of the judgment at S204 is NO, the transaction is forwarded to S212 skipping the transactions of S206–210. Whether the q-axis electric voltage is not positively saturated (+saturation) and whether the q-axis electric voltage is not negatively saturated (−saturation) is judged by q-axis electric voltage positive saturation flag or a q-axis electric voltage negative saturation flag set at the S218 or S224 of the former control cycle.

At S206, a q-axis electric current deviation integrated value ΣΔIq (current value) is calculated. More particularly, the current value of the q-axis electric current deviation integrated value ΣΔIq is obtained according to the following formula:

$$\Sigma \Delta Iq(\text{current value}) = \Sigma \Delta Iq(\text{last value}) + \Delta Iq \cdot Giq \cdot T$$

Giq denotes an electric current deviation integrated gain. T denotes a sampling period (i.e., control cycle) of the actual electric current. At S208, whether the absolute value of the q-axis electric current deviation integrated value ΣΔIq exceeds the saturation electric voltage value VO serving as a guard value is judged. Only when the outcome of the judgment at S208 is YES (i.e., when the absolute value of the q-axis electric current deviation integrated value ΣΔIq exceeds the saturation elective voltage value VO), the transaction at S210 is carried out. S210 is a transaction for limiting the absolute value of the q-axis electric current deviation integrated value ΣΔIq to be equal to or less than the saturation electric voltage value VO. More particularly, the transaction is performed with the following calculation formula:

$$\Sigma \Delta Iq = \text{sign}(\Sigma \Delta Iq) \cdot VO$$

In this case, sign ( ) is a function for outputting "1" when the value in the parentheses is the positive value and for outputting "−1" when the value in ( ) is the negative value.

The q-axis electric voltage command value Vq* is calculated at S212. The q-axis electric voltage command value Vq* is obtained according to the known formula as following:

$$Vq^* = \Delta Iq \cdot Gpq + \Sigma \Delta Iq$$

In this case, Gpq is a predetermined gain value considering the resistance value of the coil of the motor 50. When the transaction is moved from S204 to S212, the last value (i.e., the value calculated at the last control cycle) ΣΔIq is used at S212.

At S214, either the q-axis electric voltage positive saturation flag or the q-axis electric voltage negative saturation flag is cleared. At S216, it is judged whether the q-axis electric voltage command value calculated at S212 is positively saturated, in other words, whether the q axis electric voltage command value Vq* is greater than the saturation electric voltage value VO (i.e, Vq* ⊃ VO). When the outcome of the judgment at S216 is YES, the transactions at S218 and S220 is performed. When the transaction at S216 is NO, the transaction is moved to S222.

At S218, the q-axis electric voltage positive saturation flag is set. The q-axis electric voltage positive saturation flag is referred in the transaction at S204 of the next control cycle. At S220, the q axis electric voltage command value Vq* is limited to be equal to or less than the saturation electric voltage value VO. Because the transaction at S220 is carried out when the q axis electric voltage command value Vq* is positively saturated, the q axis electric voltage command value Vq* can be limited to be equal to or less than the saturation electric voltage value VO by determining the q axis electric voltage command value Vq* is equal to the saturation electric voltage value VO (i.e., Vq*=VO). Although the absolute value of the q-axis electric current deviation integrated value ΣΔIq is limited equal to or less than the saturation electric voltage value VO at the transactions of S208 and S210, the absolute value of the q axis electric voltage command value Vq* may exceed the saturation electric voltage value VO because the q axis electric voltage command value Vq* is determined by adding ΔIq·Gpq to the q-axis electric current deviation integrated value ΣΔIq at the transaction of S212. The transaction at S220 is for preventing that the absolute value of the q axis electric voltage command value Vq* exceeds the saturation electric voltage value VO even at the foregoing case.

Figure 6:
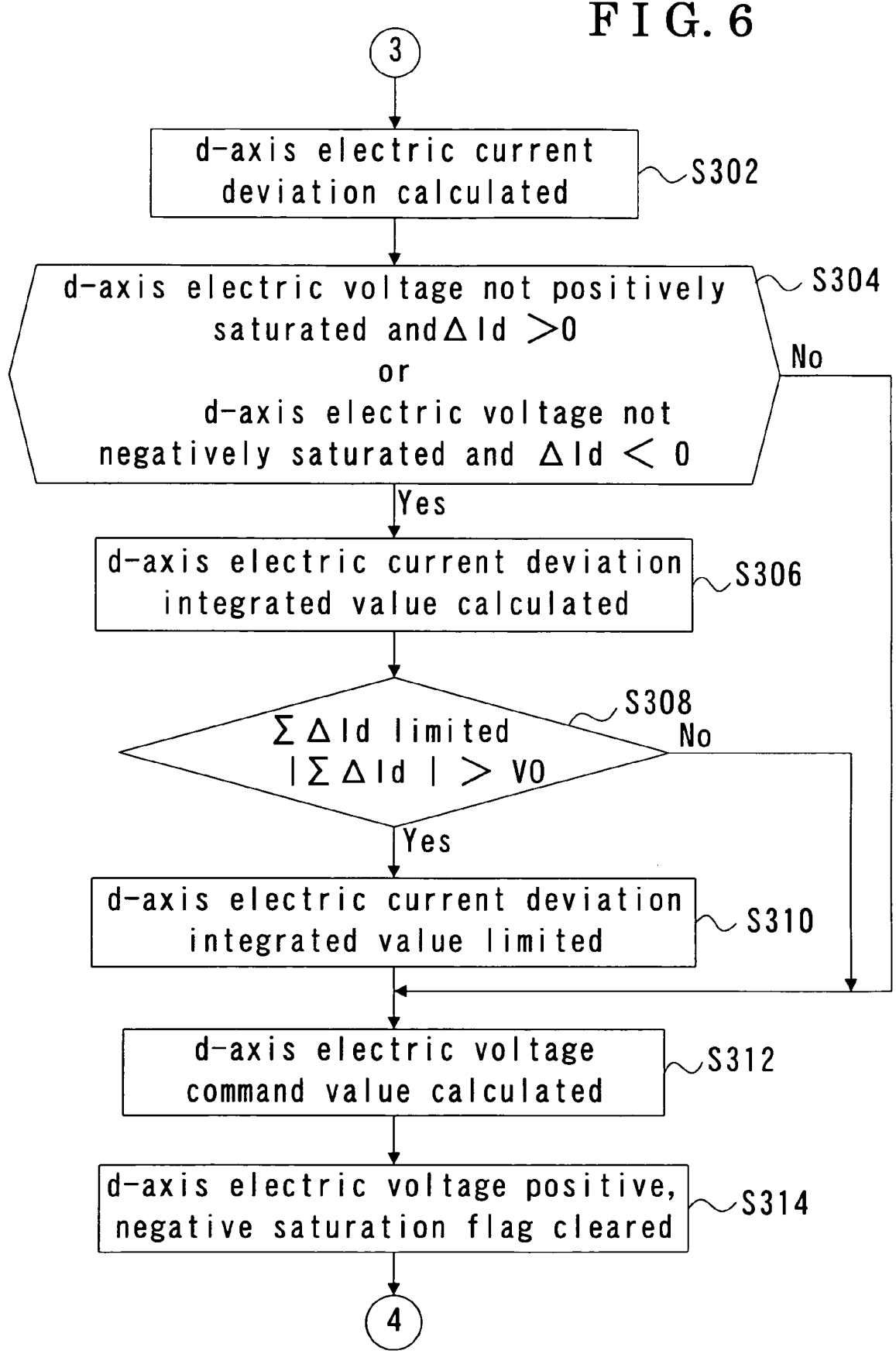
FIG. 6 is a flowchart showing a transaction for calculating the d-axis electric voltage command value Vd* according to the first embodiment of the present invention.

Transaction is moved to S302 shown in FIG. 6 after the transaction of S220. At S222, whether the q-axis electric voltage command value is negatively saturated, in other words, whether the q axis electric voltage command value Vq* is less than the negative saturation electric voltage value VO is judged. Only when the outcome of the judgment at S222 is YES, the transactions at S224 and S226 are carried out. At S224, the q-axis electric voltage negative saturation flag is set. Likewise the q-axis electric voltage positive saturation flag, the q-axis electric voltage negative saturation flag is referred in the transaction at S204 in the next control cycle. Likewise the transaction at S220, the transaction at S226 limits the value of the q axis electric voltage command value Vq* and the transaction for determining the q axis electric voltage command value Vq* to be equal to the negative saturation electric voltage value VO is carried out (i.e., Vq*=−VO). Thereafter, the transaction is moved to S302 shown in FIG. 6. In the meantime, when the transaction at S222 is judged NO, the transaction is moved to S302.

Figure 7:
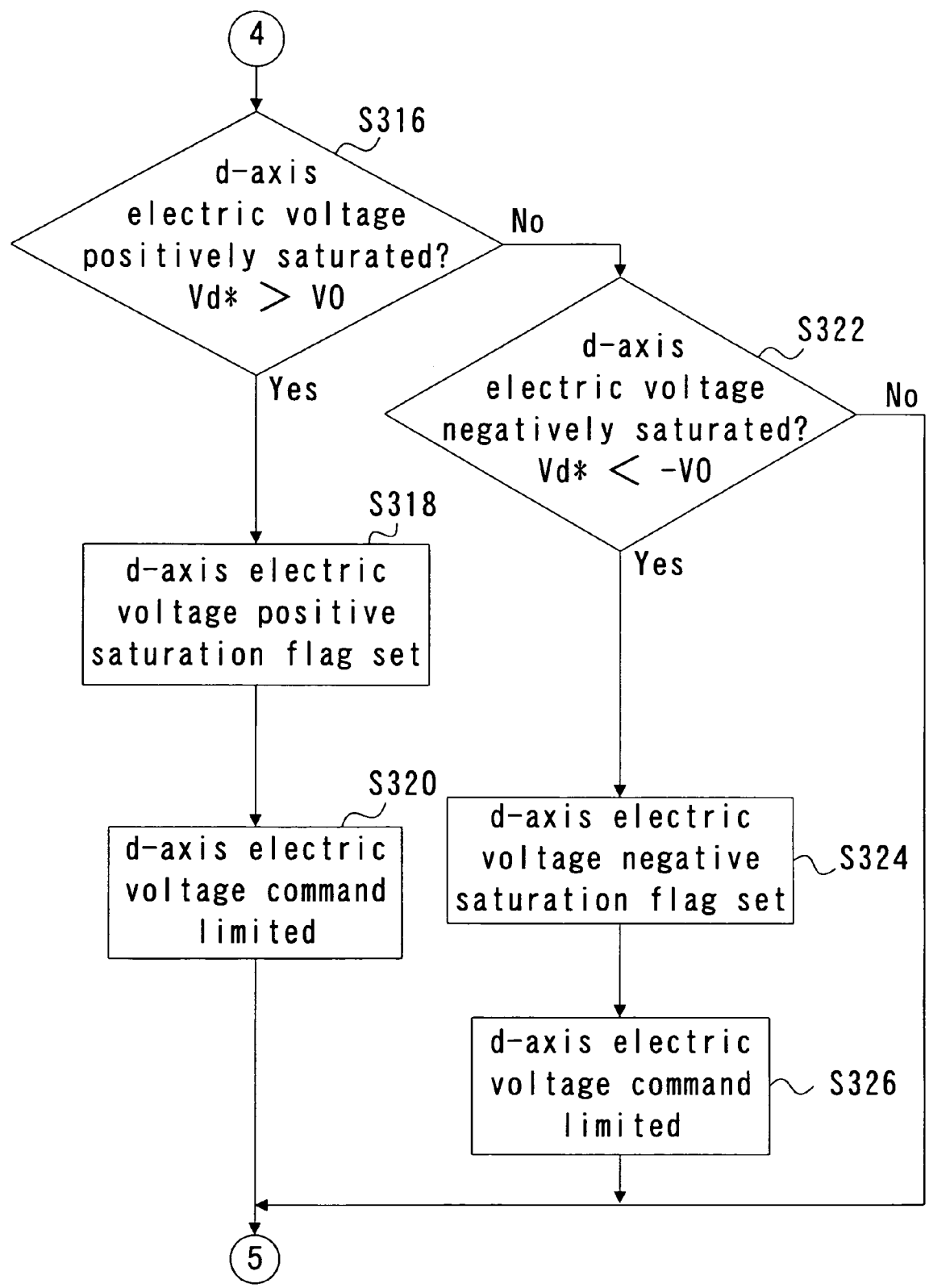
FIG. 7 is a flowchart showing the transaction for calculating the d-axis electric voltage command value Vd* continuing from FIG. 6.

After completing the transactions shown in FIGS. 4–5, the transactions shown in FIGS. 6–7 are carried out. In the transactions shown in FIGS. 6–7, the d-axis electric voltage command value Vd* is calculated. Because the d-axis electric voltage command value Vd* is obtained by the transaction procedure likewise the q axis electric voltage command value Vq*, the details of the transaction will not be explained.

In other words, because the transaction for calculating the d-axis electric voltage command value Vd* can be explained by replacing the q axis electric voltage command value Vq* with the d-axis electric voltage command value Vd* in the foregoing explanation, the explanation will be omitted. In this case, numerals of each Step S202–226 in FIGS. 4–5 correspond to the numerals of Steps in FIGS. 6–7 replacing the hundred's digit with 3 such as S302–326. Likewise, ΔId of FIG. 6 denotes a d-axis electric current deviation. ΣΔId of FIG. 6 denotes a d-axis electric current deviation integrated value.

Figure 8:
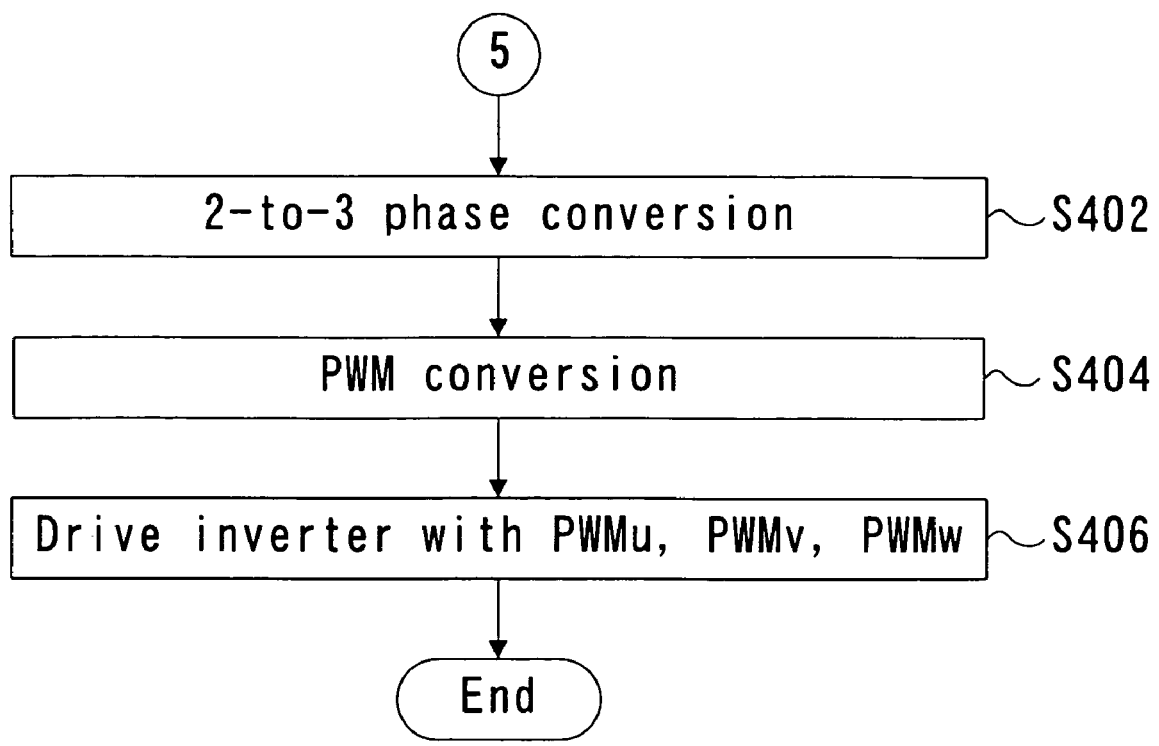
FIG. 8 is a flowchart showing a transaction for obtaining signals PWMu, PWMv, PWMw output to an inverter circuit based on the q-axis electric voltage command value Vq* and the d-axis electric voltage command value Vd* according to the first embodiment of the present invention.

The transactions at the 2-to-3 phase conversion portion 130 and the PWM control portion 140 will be explained with reference to FIG. 8. At the transactions shown in FIG. 8, the signals PWMu, PWMv, PWMw outputted to the inverter circuit 30 are obtained based on the q-axis electric voltage command value Vq* and the d-axis electric voltage command value Vd*. At S402, the q-axis electric voltage command value Vq* and the d-axis electric voltage command value Vd* are applied with the 2-to-3 phase conversion to obtain the U phase electric voltage command value Vu*, the V phase electric voltage command value Vv*, and the W phase electric voltage command value Vw*. At S404, the U phase electric voltage command value Vu*, the V phase electric voltage command value Vv*, and the W phase electric voltage command value Vw* are applied with the PWM conversion to obtain the signals PWMu, PWMv, PWMw. At S406, the signals PWMu, PWMv, PWMw are outputted to the inverter circuit 30 for actuating the inverter circuit 30.

With the foregoing transactions, the inverter circuit 30 is actuated based on the d-axis electric current command value Id* and the q-axis electric current command value Iq* inputted from the superior controller 10 to supply the pulse electric voltage applied with the PWM control to the motor 50.

The CPU 21 serves as an electric voltage command value calculation means (portion) and an electric voltage saturation judgment means (portion). The transactions shown in S202–S212 of FIG. 4 and S302–S312 of FIG. 6 correspond to the transactions at the electric voltage command value calculation portion. The transactions shown in S214–218, S222–S224 of FIG. 5 and S314–S318, S322–S324 of FIGS. 6–7 correspond to the transactions of the electric voltage saturation judgment portion.

With the embodiment of the present invention, the following effects can be obtained. Because the q-axis electric current deviation integrated value ΣΔIq and the d-axis electric current deviation integrated value ΣΔId are limited to be equal to or less than the saturation electric voltage VO, the electric current deviation integrated value does not increase exceeding the electric voltage output performance of the direct current power source portion 40 and the inverter circuit 30. Thus, the generation of the abnormality such as the overcurrent, or the like, when the motor 50 is suddenly stopped can be restrained. In addition, the delay of the response can be improved when the rotational direction of the motor 50 is suddenly reversed or when the rotation of the motor 50 is suddenly reduced, or the like.

Because whether the electric current deviation is integrated in the next control cycle is judged by setting the flag showing the electric voltage saturation based on the comparison result between the saturation electric voltage value VO and the electric voltage command values Vq*, Vd* respectively calculated at S212, S312, the electric current deviation integrated value can be securely limited to be equal to or less than the saturation electric voltage value with a simple transaction. Accordingly, a short control cycle is achieved while avoiding being CPU 21 intensive to control the motor 50 with high precision.

Because the power source electric voltage Vb of the direct current power source portion 40 is read in at the electric voltage sensor every control cycle (S110) and the saturation electric voltage value VO is calculated based on the power source electric voltage Vb (S112), the electric current deviation integrated value can be appropriately controlled even if the power source electric voltage Vb is fluctuated.

A second embodiment of the present invention will be explained with reference to FIG. 9. The motor control device of the second embodiment further includes a boosting circuit 41 for boosting the power source electric voltage outputted from the direct current power source portion 40 to output to the inverter circuit 30 and a boosting circuit control portion 42 serving as a boosting circuit control means for controlling the boosting circuit 41 in addition to the construction of the first embodiment. The construction of the boosting circuit 41 and the boosting circuit control portion 42 will be explained and the explanation of the common construction with the first embodiment applied with the same numerals will not be repeated.

Figure 9:
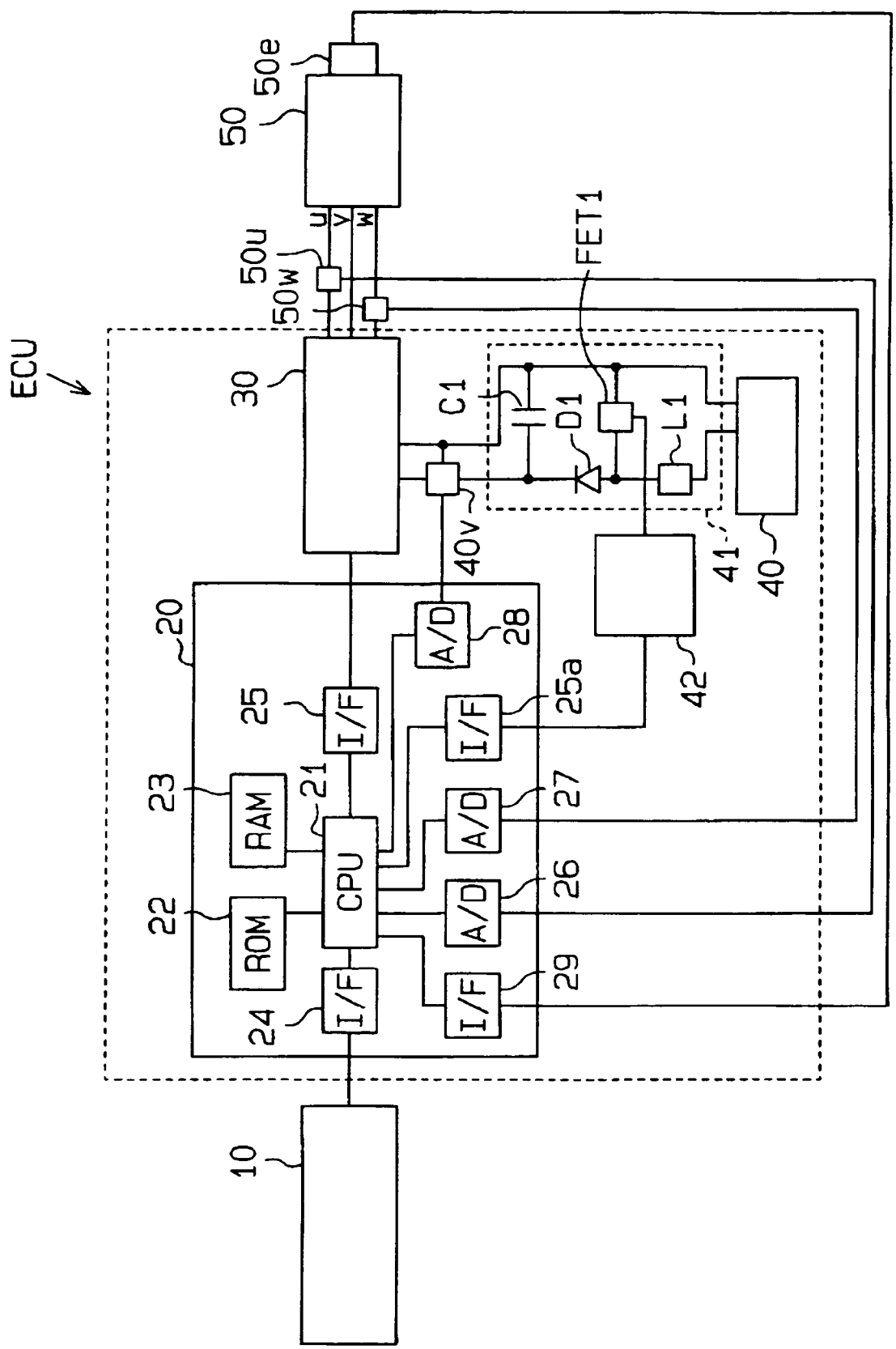
FIG. 9 is a view showing a motor control system according to a second embodiment of the present invention.

As shown in FIG. 9, the boosting circuit 41 is provided between the direct current power source 40 and the inverter circuit 30. The boosting circuit control portion 42 for controlling the boosting circuit 41 is provide at the boosting circuit 41. The boosting circuit control portion 42 is connected to the CPU 21 via an interface circuit I/F 25a of the control portion 20.

The boosting circuit 41 includes a coil L1, a field effect transistor FETl, a diode D1, and a condenser C1, for boosting the electric voltage outputted from the direct current power source portion 40 to output to the inverter circuit 30. The boosting circuit control portion 42 controls the ON-OFF of the field effect transistor FET1. By switching the ON time/OFF time of the field effect transistor FET1, the power source electric voltage Vb can be variable. The boosting circuit control portion 42 adjusts the ON time/OFF time of the field effect transistor FET1 by the command from the CPU 21. In other words, the power source electric voltage Vb in accordance with the command from the CPU 21 can be outputted from the boosting circuit 41 to the inverter circuit 30.

The effects of the foregoing embodiment will be explained as follows. The construction with the first embodiment does not have any drawbacks when the electric voltage outputted from the direct current power source portion 40 is sufficiently large relative to the load amount required for the motor 50. However, for example, in case the motor 50 is driven for power assisting a power steering of a vehicle having a battery of the vehicle (e.g., DC12V or DC24V) as the direct current power source 40, the necessary motor output (i.e., torque and revolution number) may not be obtained because the sufficient electric current is not supplied due to the lack of the electric voltage supplied to the motor 50. In this case, in order to obtain the required motor outputted from the motor 50, the number of turns of the motor coil needs to be increased to increase the motor weight and the manufacturing cost.

According to the second embodiment of the present invention, this drawback is solved by boosting the power source electric voltage Vb supplied to the inverter circuit 30 at the boosting circuit 41 to increase the electric voltage supplied to the motor 50. In other words, in case the load at the motor 50 is large and the motor output necessary for driving the load can not be obtained with the electric voltage outputted from the direct current power source portion 40, the power source electric voltage Vb is boosted to the value in accordance with the load amount of the motor 50 by the command from the CPU 21. Thus, the necessary motor output can be obtained from the motor 50.

A target value of the output electric voltage of the boosting circuit 41 may be obtained based on a map created by pre-calculating the electric voltage value necessary for each stage of the load amount of the motor 50 and memorized in the ROM 22, or the like. The target value of the output electric voltage of the boosting circuit 41 may be obtained by the calculation every control cycle based on the load amount of the motor 50. Because the load amount of the motor 50 is approximately proportional to the ratio of the ON time (i.e., output time for the electric voltage) of the switching element of the inverter circuit 30 in one control cycle, the target value of the output electric voltage of the boosting circuit 41 may be obtained by assuming the load amount based on the ratio of the ON time of the switching element in one control cycle. The load amount of the motor 50 is detectable from the actual electric current value Iu, Iv, Iw of the U phase, the V phase, the W phase or the d-axis actual electric current Id, the q-axis actual electric current Iq, or the like.

In the meantime, in case the load of the motor 50 is small and the motor output necessary for driving the load can be obtained with the electric voltage outputted from the direct current power source portion 40, the control with high precision is achievable by not performing the boosting at the boosting circuit 41. In other words, when the load of the motor 50 relative to the power source electric voltage Vb is small, the switching frequency of the switching element of the inverter circuit 30 is decreased to increase the higher harmonic of the electric current supplied to the coil of each phase of the motor 50. Thus, the electric current waveform of the coil of the motor does not assume the sine wave and the control with high precision cannot be achieved. Accordingly, in the foregoing case, the boosting at the boosting circuit 41 is not performed and the switching of the switching element of the inverter circuit 30 is performed with an appropriate frequency to achieve the control of the motor 50 with high precision.

According to the second embodiment of the present invention, in addition to the effects of the first embodiment, the motor output equal to or greater than the per se output of the electric voltage outputted from the direct current power source portion 40 to the inverter circuit 30 is obtained from the motor 50 by boosting the output electric voltage of the direct current power source portion 40 by the boosting circuit 41 to output to the inverter circuit 30. In addition, the motor 50 can be controlled with high precision by not boosting the boosting circuit 41 in case the necessary motor output can be obtained from the motor 50 without boosting the output electric voltage of the direct current power source portion 40.

Although the present invention is applied to the control for the blushless three phase DC motor in the embodiments, an induction motor, a DC motor with blush, or the like, may be applied. The present invention may be applied to a linear motor for the linear movement.

The DC motor with the blush may be controlled by controlling the power source electric voltage Vb by maintaining the constant pulse width of the pulse electric voltage outputted from the inverter circuit 30 to the motor 50. In other words, the motor 50 may be controlled by the PAM control (i.e., Pulse Amplitude Modulation control).

According to the embodiments of the present invention, because the electric current deviation integrated value does not increase exceeding the electric voltage output performance of the inverter circuit, the generation of the abnormality and the delay of the response can be restrained at the sudden stop of the motor, at the sudden speed reduction of the motor, and at the sudden reverse movement of the motor rotation.

According to the embodiment of the present invention, the larger motor output than the case supplying the per se power source electric voltage outputted from the direct current power source portion to the inverter circuit can be obtained.

According to the embodiment of the present invention, the electric current deviation integrated value can be limited not to exceed the saturation electric voltage value securely by the simple transaction.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A motor control device comprising:
an electric voltage command value calculation means for inputting an electric current command value every control cycle, calculating an electric current deviation integrated value by integrating an electric current deviation between the electric current command value and an actual electric current value at a coil of a motor, and calculating an electric voltage command value in accordance with the electric current deviation integrated value;

a direct current power source unit configured to output a power source electric voltage of a direct current;

an inverter circuit configured to output a pulse electric voltage generated by switching the power source electric voltage, by a switching element, to the motor;

a control means for controlling a switching timing of the switching element based on the electric voltage command value; and the electric voltage command value calculation means controls the electric current deviation integrated value not to exceed a saturation electric voltage value, wherein the saturation electric voltage value is a maximum value of the electric voltage outputted from the inverter circuit to the motor.

2. The motor control device according to claim 1, further comprising:

a boosting circuit configured to boost the power source electric voltage outputted from the direct current power source unit to the inverter circuit;

a boosting circuit control unit configured to control the output electric voltage of the boosting circuit in accordance with a load amount of the motor; and the inverter circuit configured to apply a pulse electric voltage generated by switching the output electric voltage of the boosting circuit by the switching element to the motor.

3. The motor control device according to claim 1, further comprising:

an electric voltage saturation judgment means for judging an electric voltage saturation when the calculated electric voltage command value is greater than the saturation electric voltage value every control cycle;

the electric voltage command calculation means does not perform the integration of an electric current deviation for further increasing the electric current deviation integrated value at the next control cycle when the electric voltage saturation judgment means judges the electric voltage saturation.

4. The motor control device according to claim 2, further comprising:

an electric voltage saturation judgment means for judging an electric voltage saturation when the calculated electric voltage command value is greater than the saturation electric voltage value every control cycle;

the electric voltage command calculation means does not perform the integration of an electric current deviation for further increasing the electric current deviation integrated value at the next control cycle when the electric voltage saturation judgment means judges the electric voltage saturation.

5. A motor control device according to claim 1, wherein the electric voltage command value calculation means controls the electric voltage command value by judging whether the absolute value of the electric current deviation integrated value is greater than the saturation electric voltage value.

6. A motor control method comprising a process of:

inputting an electric current command value every control cycle;

calculating an electric current deviation integrated value by integrating an electric current deviation between the electric current command value and an actual electric current value at a coil of a motor;

calculating an electric voltage command value in accordance with the electric current deviation integrated value;

outputting a pulse electric voltage generated by switching a power electric voltage of a direct current by a switching element of an inverter circuit based on the electric voltage command value to the motor; and controlling the electric current deviation integrated value not exceeding a saturation electric voltage value, wherein the saturation electric voltage value is a maximum value of the electric voltage outputted from the inverter circuit to the motor.

7. The motor control method according to claim 6, wherein a power source electric voltage supplied to the inverter circuit is boosted in accordance with a load amount of the motor.

8. The motor control method according to claim 6, wherein when the calculated electric voltage command value is greater than the saturation electric voltage value every control cycle to be judged as an electric voltage saturation, the integration of the electric current deviation for further increasing the electric current deviation integration value at the next control cycle is not performed.

9. The motor control method according to claim 7, wherein when the calculated electric voltage command value is greater than the saturation electric voltage value every control cycle to be judged as an electric voltage saturation, the integration of the electric current deviation for further increasing the electric current deviation integration value at the next control cycle is not performed.

* * * * *